United States Patent [19]

Wippenbeck et al.

[11] Patent Number: 5,546,389
[45] Date of Patent: Aug. 13, 1996

[54] METHOD OF CONTROLLING ACCESS TO A BUFFER AND A DEVICE FOR TEMPORARY STORAGE OF DATA PACKETS AND AN EXCHANGE WITH SUCH A DEVICE

[75] Inventors: Matthias Wippenbeck; Gert Willmann, both of Stuttgart; Karl Schrodi, Heimsheim, all of Germany

[73] Assignee: Alcatel N.V., Rijswijk, Netherlands

[21] Appl. No.: 273,716

[22] Filed: Jul. 12, 1994

[30] Foreign Application Priority Data

Jul. 13, 1993 [DE] Germany .................. 43 23 405.4

[51] Int. Cl.⁶ ........................................ H04Q 11/04
[52] U.S. Cl. ............... 370/60; 370/85.6; 370/94.1; 370/110.1
[58] Field of Search .................. 370/60, 94.1, 85.13, 370/85.14, 118, 17, 110.1, 85.6

[56] References Cited

U.S. PATENT DOCUMENTS

| | | | |
|---|---|---|---|
| 4,845,710 | 7/1989 | Nakamura et al. | 370/110.1 |
| 4,953,157 | 8/1990 | Franklin et al. | 370/60 |
| 5,197,064 | 3/1993 | Chao | 370/94.1 |
| 5,222,085 | 6/1993 | Newman | 370/60 |
| 5,359,592 | 10/1994 | Corbalis et al. | 370/94.1 |
| 5,367,643 | 11/1994 | Chang et al. | 370/60 |
| 5,381,404 | 1/1995 | Sugano et al. | 370/94.1 |

OTHER PUBLICATIONS

"Priority Queuéing Strategies and Buffer Allocation Protocols for Traffic Control at an ATM Integrated Broadband Switching System", A. Lin et al, *IEEE Journal on Selected Areas in Communications*, vol. 9, No. 9, Dec. 1991, pp. 1524–1536.

"Comparative Performance Study of Space Priority Mechanisms for ATM Network", H. Kröner, Proceedings IEEE Infocom '90, The Conference on Computer Communications, Ninth Annual Joint Conference of the IEEE Computer and Communications Societies, Los Alamitos, CA, Jun. 3–7, 1990, pp. 1136–1143.

"Dimensioning of an ATM switch with shared buffer and threshold priority", J. F. Meyer, et al, Computer Networks and ISDN Systems vol. 26, No. 1, 1993, pp. 95–108.

*Primary Examiner*—Douglas W. Olms
*Assistant Examiner*—Shick Honn
*Attorney, Agent, or Firm*—Ware, Fressola, Van Der Sluys & Adolphson

[57] ABSTRACT

Data packets (D1, D2) each assigned to one of at least two priority classes (P1, P2) are stored in a buffer (MEM2) designed to hold data on a threshold value for each priority class wherein, instead of having the threshold fixed for each priority class whereby the data packets of the corresponding priority class will no longer be written into the buffer (MEM2) when the threshold is exceeded ("partial buffer sharing"), one or more thresholds are dynamically controlled. The current loss probability of the highest priority class (P1) is determined, and the threshold (MEM1) of the lowest priority class (P2) is then raised or lowered (REG1). This results in improved buffer utilization in applications which require a given loss probability for high priority classes, and calculation of a threshold value is no longer necessary.

8 Claims, 2 Drawing Sheets

METHOD OF CONTROLLING ACCESS TO A BUFFER AND A DEVICE FOR TEMPORARY STORAGE OF DATA PACKETS AND AN EXCHANGE WITH SUCH A DEVICE

TECHNICAL FIELD

The invention concerns a method for controlling the access to a buffer and, more particularly, to a device for the temporary storage of data packets and to an exchange for a telecommunications network with such a device.

BACKGROUND OF THE INVENTION

In ATM (Asynchronous Transfer Mode) devices, the buffering of data packets (also called cells) has great significance.

In ATM communications networks, both synchronous (more accurately: isochronous) data, such as speech or video data, and asynchronous data, such as occur in communications between data processing installations, are guided along the same physical connection paths. Each of these different data communication services has entirely different requirements regarding the quality of the data connection. For example, communication between data processing installations permit considerably lower (cell) loss probabilities than a speech communication.

It therefore makes sense to assign different priority classes to the data packets, and to treat them differently in the exchanges. This requires temporary memories, which guarantee an upper limit of the loss probability to the data packets as a function of priority, under the best possible utilization of the memory space.

The article "Priority Queuing Strategies and Buffer Allocation Protocols for Traffic Control at an ATM Integrated Broadband Switching System" by Arthur Y. -M. Lin and John A. Sylvester in the IEEE Journal on Selected Areas in Communications, Vol. 9, No. 9, December 1991, describes a generic access control method for a buffer as "partial buffer sharing".

Data packets, which are assigned to one of two priority classes, one high and one low, are stored together in a buffer. For each priority class, a threshold value for comparison with the occupancy level of the buffer is determined, before placing the buffer into service. The threshold value for the high priority class is determined for a value that corresponds to the maximum occupancy level of the buffer. The threshold value for the lower priority class is established at a value between 0 and the maximum occupancy level of the buffer, based on theoretical traffic calculations.

The buffer is organized as a FIFO-queue (First In First Out). There are several readout devices, which remove one data packet each from the lower end of the queue. The lower end of the queue contains the data packet that was written first into the queue.

High and low priority data packets arrive at the buffer in accordance with a predetermined random process. These data packets are treated as follows:

a) If it is a data packet of the high priority class, and there is still room in the buffer, the data packet is inserted at the upper end of the queue.

b) If it is a data packet of the lower priority class, and the occupancy level of the buffer is below the size determined by the threshold value of the lower priority class, this data packet is also inserted at the upper end of the queue. In the other cases the incoming data packet is discarded and is thus lost.

This method of access control leads to the fact that only a part of the spaces in the buffer is useable for the data packets of both priority classes. The memory space corresponding to the difference between the maximum occupancy level of the buffer and the threshold value for the lower priority class, is reserved for the data packets of the higher priority class. This produces a lower loss probability for these data packets than for those of the lower priority class.

This takes into account that the buffer is always used somewhat less than a fully shared buffer, thus slightly increasing the total loss probability.

If an upper limit is to be guaranteed for the data packets of the higher priority class, in many practical application cases the use of the buffer is considerably below that which can be explained by this effect.

DISCLOSURE OF INVENTION

The invention has the task of improving this poor utilization of the buffer that occurs in many application cases with "partial buffer sharing", thus reducing the size of the required buffer.

According to the present invention, an improved method of controlling access to a buffer in which data packets each assigned to one of at least two priority classes are stored together, comprises the steps of assigning each priority class a threshold value for comparing with an occupancy level of the buffer, the threshold value of a higher priority class being greater than or equal to that of a lower one, determining the priority class of a data packet arriving at the buffer and the occupancy level of the buffer at the time of arrival of the data packet comparing the occupancy level with the threshold value assigned to the priority class of the data packet, and wherein based on this comparison, deciding as to whether the data packet is written into the buffer or discarded, wherein the improved method further comprises the step of dynamically controlling at least one threshold value.

According to another aspect of the present invention, an improved apparatus for temporarily storing data packets each assigned to one of at least two priority classes, comprises a first memory device for storing data relating to a threshold value, a second memory device for said temporarily storing data packets, an access control device for receiving data packets and for providing said data packets to the second memory device and which apparatus, based on the data relating to a threshold value from the first memory device and based on data on an occupancy level of the second memory device, for deciding whether to enter incoming data packets into the second memory device or to discard them, and one or more readout devices for reading out data packets from the second memory device, wherein the improved apparatus further comprises a controller which dynamically changes the data relating to a threshold value in the first memory device.

According to a third aspect of the present invention, an exchange for a communications network for transporting data packets each assigned to one of at least two priority classes, comprises at least one apparatus for temporarily storing data packets which includes a first memory device for providing a threshold data signal having a magnitude indicative of a threshold value for each priority class, a second memory device which serves as a buffer, an access control device for receiving said data packets and for entering said data packets into the second memory device, said control device responsive to the threshold data signal from the first memory device and an occupancy data signal indicative of an occupancy level of the second memory device, for deciding whether to enter incoming data packets into the second memory device or to discard them, and one or more readout devices for retrieving data packets from the second memory device, wherein the magnitude of the threshold signal provided by the first memory device is changeable, and that the further apparatus comprises a controller which dynamically changes the magnitude of the threshold data signal provided by the first memory device.

The invention is based on the insight that the poor utilization of the buffer is the result of a threshold value that is not optimally adjusted for the lower priority class. The invention teaches that the optimum threshold value depends on the requirements and the characteristics of the incoming and outgoing traffic. However, this is not predictable in most instances, and changes in the course of time. For that reason, according to the invention, the threshold value of the lower priority class is adjusted dynamically, thus optimizing the buffer load.

These and other objects, features and advantages of the present invention will become more apparent in light of the detailed description of a best mode embodiment thereof, as illustrated in the accompanying drawing.

BEST MODE FOR CARRYING OUT THE INVENTION

A first example depicts the use of the method according to the invention in a device according to the invention for the temporary storage of data packets, each of which belongs to one of two priority classes.

Figure 1:
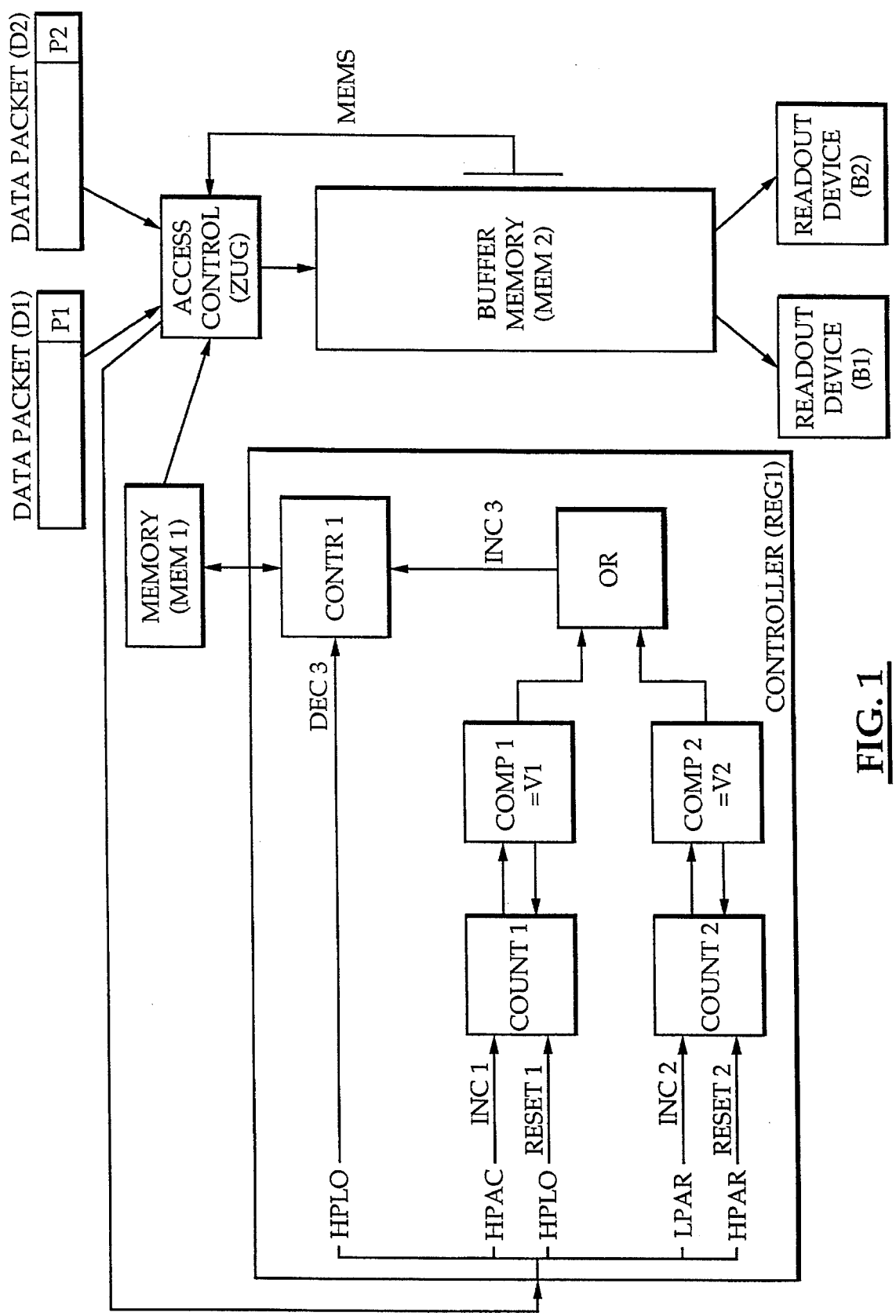
FIG. 1 is a symbolic representation of a first device according to the invention for the temporary storage of data packets in a first configuration example.

FIG. 1 contains a memory MEM1, a buffer MEM2, an access control unit ZUG, two readout devices B1 and B2 and a controller REG1.

Two data packets D1 and D2 arrive at the access control unit ZUG.

The access control unit ZUG makes several signals available to the controller REG1 and decides in addition on the basis of data, which provide information about the occupancy level MEMS of buffer MEM2, and data from the memory MEM1, whether or not an incoming data packet is written into the buffer MEM2. The data packets in the buffer MEM2 are read out by the readout devices B1 and B2 from the buffer MEM2. The data in memory MEM1 can be read and changed by the controller REG1.

The data packets D1 and D2 are data packets like those used to exchange information in a communications network. They carry an identification signal which indicates the priority class to which they are assigned. Data packet D1 is assigned to the priority class P1 and data packet D2 is assigned to the priority class P2. In this instance P1 corresponds to the higher and P2 to the lower priority class.

In addition, it is also possible for the data packets D1 and D2 to have a different form or application. For example, such a data packet could represent the context of a waiting process in a data processing system.

The buffer MEM2 is organized as a FIFO-queue. However, other buffer principles, such as e.g. that the shorter data packet must be read first, can be envisioned.

The occupancy level MEMS of buffer MEM2 is a measure of the number of occupied places in the queue. That message is sent to the access control unit.

Memory MEM1 contains two threshold values, which help the access control unit ZUG to compare the occupancy levels MEMS of buffer MEM2. The first threshold value is assigned to the higher priority class P1. This value is applied to the maximum occupancy level of buffer MEM2. This means that the buffer is full as soon as the occupancy level MEMS of buffer MEM2 has reached this value.

The second threshold value is assigned to the lower priority class P2. It is fixed at a value between the threshold value assigned to the higher priority class and the value corresponding to an empty buffer MEM2. This threshold value, in accordance with the present invention, is dynamically changed by the controller REG1.

It is also possible to regulate the first threshold value. For example, an unused storage location could be made available to other function units.

The access control unit ZUG receives the incoming data packets and determines the priority class to which each of these data packets is assigned. Subsequently it compares the occupancy level MEMS of buffer MEM2 with the threshold value from memory MEM1, which is assigned to the priority class of the corresponding data packet.

In this example it therefore compares the first threshold value for the data packet D1 and the second threshold value for data packet D2 with the occupancy level MEMS of buffer MEM2.

If the occupancy level MEMS is lower than the threshold value, the data packet is entered into the buffer MEM2. If this is not the case, it is discarded. For the data packet D1, this means that it is only discarded when buffer MEM2 is full. The data packet D2 is discarded earlier, namely as soon as the occupancy level MEMS has reached the second threshold value stored in memory MEM1.

In addition, other methods can be envisioned: e.g. the length of an incoming data packet could also play a part in the decision.

The controller REG1 contains two counters COUNT1 and COUNT2, two comparators COMP1 and COMP2, a control unit CONTR1 and an OR-gate.

Each of the counters COUNT1 and COUNT2 has a counting input INC1 or INC2 and a reset input RESET1 or RESET2. The control unit CONTR1 changes the threshold value of the lower priority class P2 in memory MEM1. It contains two inputs DEC3 and INC3. With a pulse at input DEC3 it lowers the threshold value and increases it with a pulse at input INC3. The threshold value is not changed if simultaneous pulses exist at both inputs DEC3 and INC3. The access control unit ZUG makes event signals HPLO, HPAC, HPAR and LPAR available to the controller. These signals transmit information in the form of pulses, which describe certain events. Selected events may be represented, for example, by HPAR and LPAR pulses each corresponding to the arrival of a high-priority and a low-priority packet, respectively, and by HPAC and HPLO pulses corresponding, respectively, to a high-priority packet written into the buffer (accepted) and discarded (lost).

Thus, event signals HPAR and LPAR produce a pulse when a data packet of the high priority class P1 or a data packet of the lower priority class P2 arrive at the access control unit ZUG. Event signal HPAR is therefore a measure of the magnitude of higher priority class incoming traffic, and event signal LPAR is of the lower priority class.

Event signal HPLO controls the reset input RESET1 and event signal HPAC the counting input INC of counter COUNT1. Counter COUNT1 is cleared with a pulse at reset input RESET1. The reading of counter COUNT1 is compared to a reference value V1 by comparator COMP1. If the reading is higher than this value, counter COUNT1 is cleared and the OR-gate sends a pulse to the counting input INC3 of control unit CONTR.

Event signal LPAR controls the counting input INC2 and event signal HPAR the reset input RESET2 of counter COUNT2. With a pulse at the counting input INC2, counter COUNT2 goes up by one, it is cleared with a pulse at the reset input RESET2. The reading is compared with a reference value V2 by comparator COMP2. If the count is greater than the reference value V2, the counter COUNT2 is cleared and the OR-gate sends a pulse to the counting input INC3 of control unit CONTR1.

The two reference values V1 and V2 are used to adjust the loss probability of the high priority class data packets. In this case, the reference value V1 is adjusted to the reciprocal value of the desired loss probability, and the reference value V2 may be set less, e.g., to about one tenth of that value.

The input DEC3 of control unit CONTR1 is controlled by the event signal HPLO. This results in the following function of controller REG1:

The event signals HPLO and HPAC determine the loss probability of the high priority class P1 data packets. The loss of such a data packet causes the threshold value for the lower priority class to be reduced. This threshold value is increased if a number of such data packets that corresponds to the reference value V1 is not discarded in sequence. The controlled threshold value becomes transient at a point determined by the loss probability of the high priority step P1 data packets.

The event signals LPAR and HPAR determine the traffic conditions between the incoming data packets of the high and the low priority classes. The controlled threshold value increases with heavy traffic of the low priority class data packets, as evidenced by a number of low priority class data packets, corresponding to the reference value V2, arriving in sequence at the access control unit ZUG. However, the controlled threshold value does not change if a data packet of the high priority class P1 is lost at the same time.

The additional control by means of event signals LPAR and HPAR could also be omitted. It only improves the dynamic properties of controller REG1 for a small portion of data packets of the high priority class P1.

This example shows the control of a threshold value in a temporary memory for data packets, each of which belongs to one of two priority classes.

It is also possible to expand the device of the first example for data packets that belong to one of more than two priority classes. This would require correspondingly more threshold values in memory MEM1, which would then be changed by a controller similar to controller REG1.

Furthermore, it could also be envisioned to dynamically control only one threshold value.

A second example also illustrates the use of the method according to the invention in a device according to the invention for the temporary storage of data packets.

Figure 2:
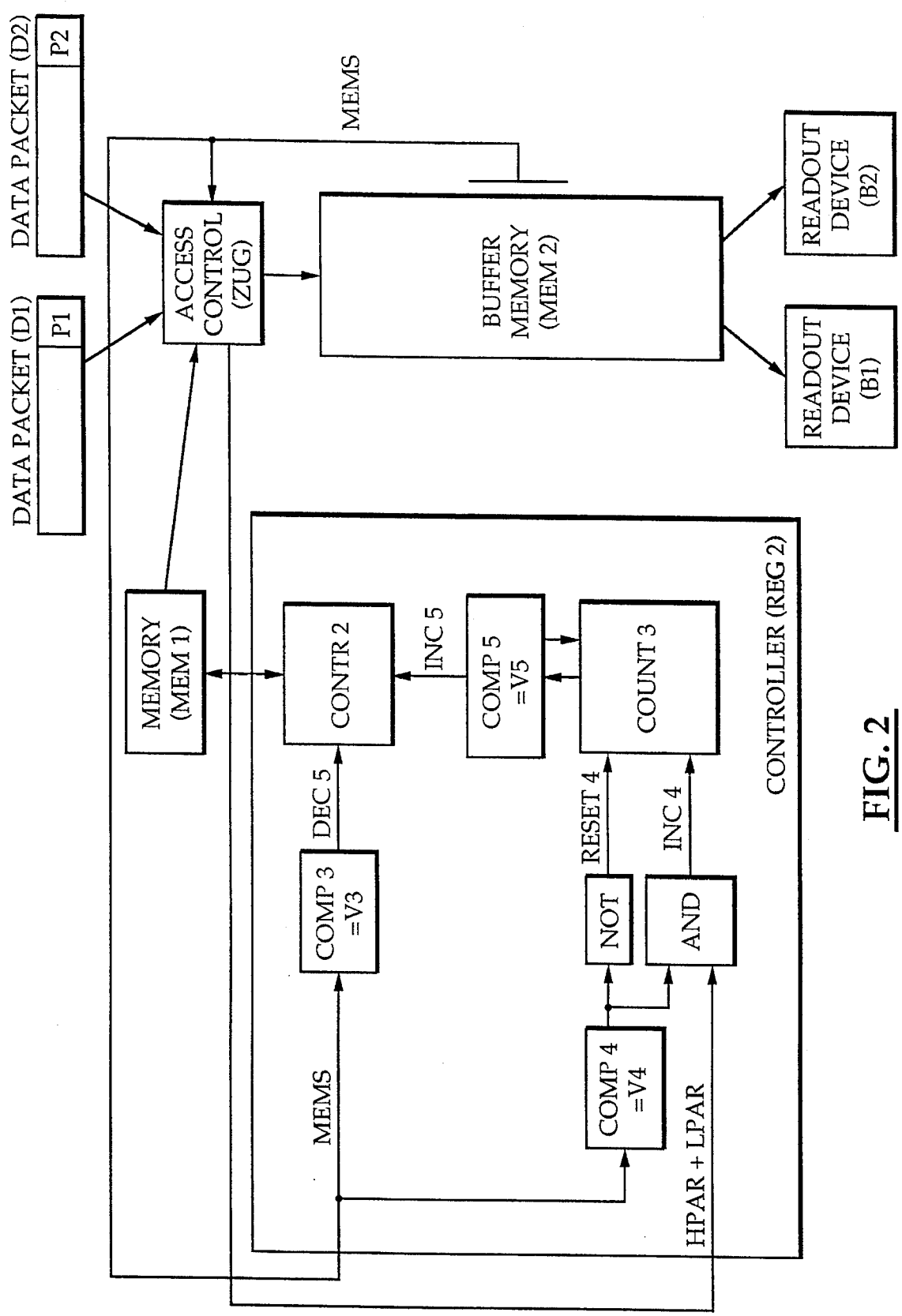
FIG. 2 is a symbolic representation of a second device according to the invention for the temporary storage of data packets in a second configuration example.

FIG. 2 depicts a memory MEM1, a buffer MEM2, an access control unit ZUG, two readout devices B1 and B2, a controller REG2 and two incoming data packets D1 and D2.

The device in the second example is similar to the first example, except for the controller. For that reason only the function of the controller REG2 is explained here.

The controller REG2 has a counter COUNT3, three comparators COMP3, COMP4, COMP5, an inverter NOT, an AND gate and a control unit CONTR2. The counter COUNT3 has a counting input INC4 and a reset input RESET4. The control unit CONTR2 has two inputs DEC5 and INC5.

The occupancy level MEMS of the buffer and an event signal HPAR+LPAR are input data for the controller REG2. The signal transmits information in the form of pulses, which are produced by the access control unit ZUG each time a data packet of the high or the low priority class arrives. A time signal from a clock could also be used instead of the event signal HPAR+LPAR.

Comparator COMP3 compares the occupancy level MEMS with the reference value V3. If the occupancy level MEMS exceeds the reference value V3, the control unit CONTR2 is ordered through input DEC5 to reduce the controlled threshold value in control unit CONTR2. Comparator COMP4 compares the occupancy level MEMS with the reference value V4. If the occupancy level MEMS is higher than the reference value V4, the counter COUNT3 is cleared by the inverter NOT. If it is lower or the same, the counter COUNT3 goes up by one for each pulse at the counting input INC4. This input is controlled by the event signal HPAR+LPAR. The reading of counter COUNT3 is compared with the reference value V5. As soon as the reading exceeds the reference value V5, the counter is cleared and the control unit CONTR2 is ordered through input INC5 to increase the controlled threshold value.

The three reference values V3, V4 and V5 determine the loss probability of the high priority class data packets. When selecting the two reference values V3 and V4, there is the restriction that V3 must be larger than V4, but smaller than the maximum occupancy level of the buffer. With a storage capacity of 16 data packets in buffer MEM2, the negative exponential traffic characteristics of the data packets and a variation of the traffic portion of the high priority data packets between 25% and 50%, the reference value V3 is set to about 12, the reference value V4 to about 6 and the reference value V5 to about 100, for a loss probability of e.g. $2 \times 10^{-5}$.

In the second example, the thus controlled threshold value is reduced when the occupancy level MEMS exceeds a first threshold that corresponds to reference value V3. It is increased when the occupancy level MEMS remains below a second threshold, which corresponds to reference value V4, during the arrival of a number of data packets in sequence, which corresponds to reference value V5.

An advantageous use of the method according to the invention in an ATM exchange is illustrated by a third example.

The incoming data packets are temporarily stored in such an exchange before, after or during switching by a coupling unit. One temporary memory is required for each line in which data packets arrive or leave. The devices according to the invention are used in these locations for the temporary storage of data packets. This has the advantage that an upper limit of loss probability can be guaranteed for the data packets of a higher priority class.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An improved method of controlling access to a buffer in which data packets each assigned to one of at least two priority classes are stored together, comprising the steps of assigning each priority class a threshold value, the threshold value of a higher priority class being greater than or equal to that of a lower one, determining the priority class of a data packet arriving at the buffer and an occupancy level of the buffer at the time of arrival of the data packet, comparing the occupancy level with the threshold value assigned to the priority class of the data packet, and wherein based on this comparison, deciding as to whether the data packet is written into the buffer or discarded, wherein the improved method further comprises the step of determining traffic data and dynamically regulating a threshold value of at least one priority class based on a determination of traffic data.

2. The improved method as claimed in claim 1, further comprising the steps of determining and evaluating a loss probability of data packets of one or more priority classes, and to this end, determining and counting two events, namely that a data packet is written into the buffer and that a data packet is discarded.

3. The improved method as claimed in claim 1, further comprising the steps of quantitatively determining incoming traffic caused by data packets of one or more priority classes, and to this end, determining and counting the event that a data packet arrives at the buffer.

4. The improved method as claimed in claim 1, wherein said step of determining the occupancy level of the buffer is carried out at different times.

5. Improved apparatus for temporarily storing data packets each assigned to one of at least two priority classes, comprising a first memory device for storing data relating to a threshold value, a second memory device for said temporarily storing data packets, an access control device for receiving data packets and for providing said data packets to the second memory device and which apparatus, based on the data relating to a threshold value from the first memory device and based on data on an occupancy level of the second memory device, for deciding whether to write incoming data packets into the second memory device or to discard said data packets, and one or more readout devices for reading out data packets from the second memory device, wherein the improved apparatus further comprises a controller for determining traffic data and for dynamically changing the data relating to a threshold value in the first memory device based on determined traffic data.

6. The improved apparatus as claimed in claim 5, wherein the controller has an input for at least one timing signal.

7. The improved apparatus as claimed in claim 5, wherein the access control device provides at least one event signal which is determined from events including a time of arrival or a discarding of data packets, and wherein the controller has an input for at least one such event signal.

8. An exchange for a communications network for transporting data packets each assigned to one of at least two priority classes, comprising at least one apparatus for temporarily storing data packets which includes a first memory device for providing a threshold data signal having a magnitude indicative of a threshold value for each of said at least two priority classes, a second memory device which serves as a buffer, an access control device for receiving said data packets and for entering said data packets into the second memory device, said control device responsive to the threshold data signal from the first memory device and an occupancy data signal indicative of an occupancy level of the second memory device, for deciding whether to write incoming data packets into the second memory device or to discard said data packets, and one or more readout devices for retrieving data packets from the second memory device, wherein the magnitude of the threshold signal provided by the first memory device is changeable, and that the apparatus further comprises a controller which dynamically changes the magnitude of the threshold data signal provided by the first memory device according to a determination of traffic data.

* * * * *

UNITED STATES PATENT AND TRADEMARK OFFICE
CERTIFICATE OF CORRECTION

PATENT NO. : 5,546,389
DATED : August 13, 1996
INVENTOR(S) : Wippenbeck et al

It is certified that error appears in the above-indentified patent and that said Letters Patent is hereby corrected as shown below:

At column 7, line 16, (claim 1, line 13) please cancel "step" and substitute --steps-- therefor.

Signed and Sealed this

Thirty-first Day of December, 1996

Attest:

BRUCE LEHMAN

Attesting Officer      Commissioner of Patents and Trademarks